No. 688,507. Patented Dec. 10, 1901.
E. FINN.
SCALE BEARING.
(Application filed Nov. 12, 1900.)
(No Model.) 2 Sheets—Sheet 1.
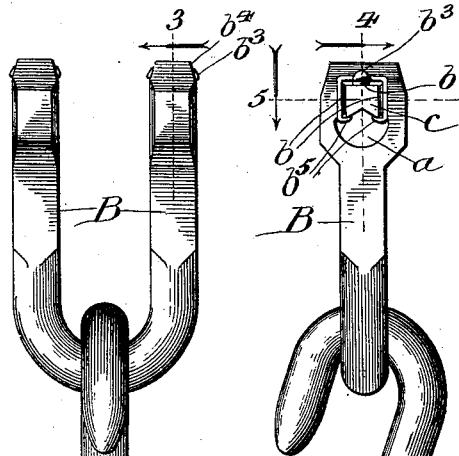
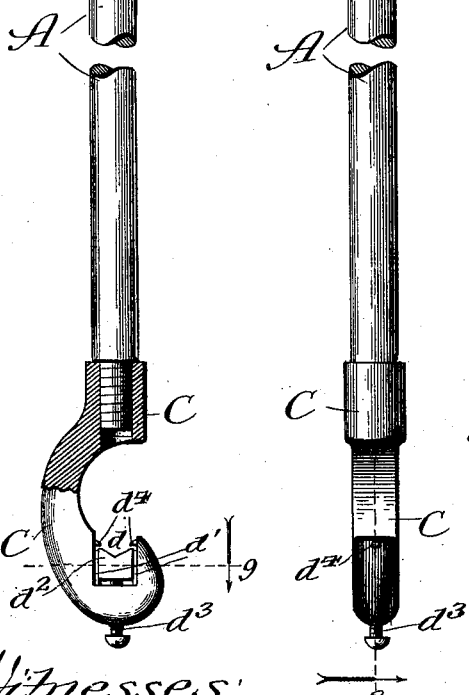
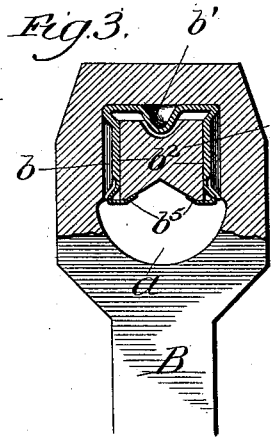
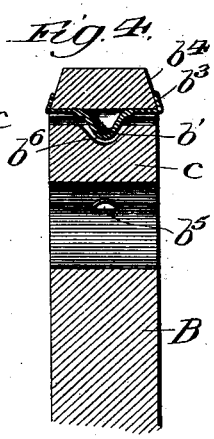
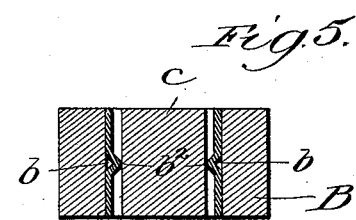
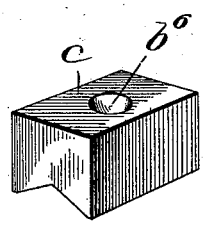
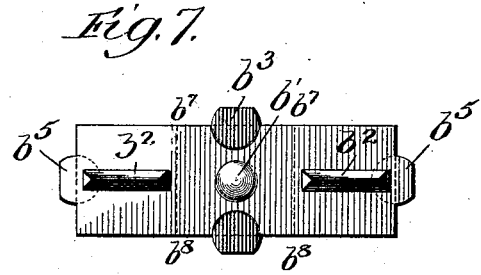
Witnesses:
Inventor:
Edwin Finn, No. 688,507. Patented Dec. 10, 1901.
E. FINN.
SCALE BEARING.
(Application filed Nov. 12, 1900.)
(No Model.) 2 Sheets—Sheet 2.
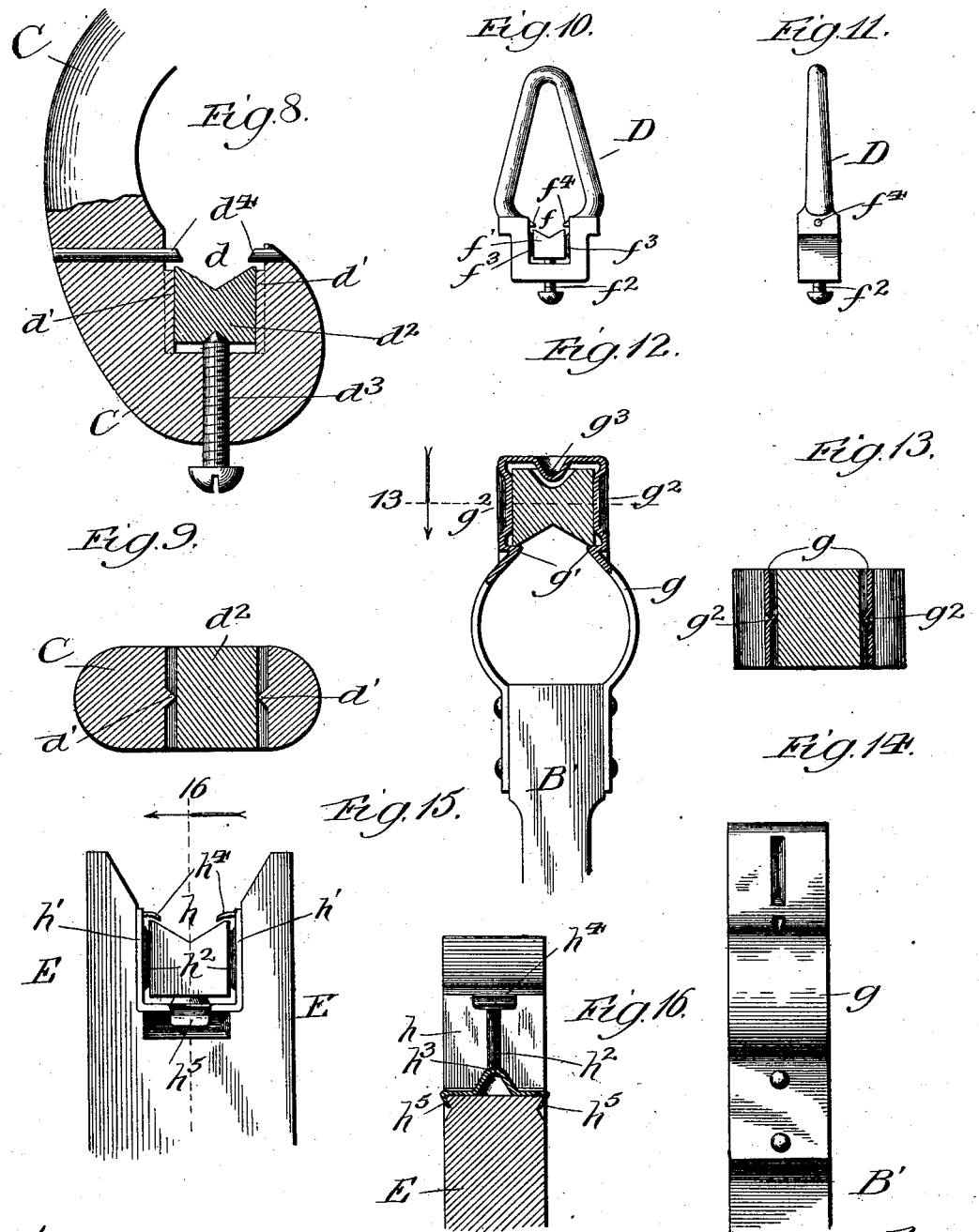

UNITED STATES PATENT OFFICE.

EDWIN FINN, OF ELKHART, INDIANA, ASSIGNOR, BY MESNE ASSIGNMENTS, TO WALTER F. STIMPSON, OF DETROIT, MICHIGAN.

SCALE-BEARING.

SPECIFICATION forming part of Letters Patent No. 688,507, dated December 10, 1901.

Application filed November 12, 1900. Serial No. 37,080. (No model.)

*To all whom it may concern:*

Be it known that I, EDWIN FINN, a citizen of the United States, residing at Elkhart, in the county of Elkhart and State of Indiana, have invented new and useful Improvements in Scale-Bearings, of which the following is a specification.

My invention relates particularly to certain scale-bearings which have heretofore been without suitable provision against friction and rust, such as the bearings at the steelyard-rod and at certain other locations where the bearings are either inverted or subject to considerable movement.

My object is to provide bearings for such locations equipped with suitable separately-formed self-adjusting bearing-blocks—such, for instance, as non-corrosive agate blocks.

In carrying out my invention I employ novelly-mounted bearing-blocks at the bearings for the steelyard-rod clevis at the lower end or hook of the steelyard-rod and at all the bearings for the platform. The invention may be employed in a substitute for the scale-loop shown in Patent No. 652,957, granted to me July 3, 1900. Also it may be employed advantageously in connection with a certain form of spider or frame interposed between the levers and the platform of the scale. In all situations except the last-mentioned one the members equipped with the blocks are tension members.

In the accompanying drawings my invention is illustrated in various embodiments.

Figures 1 and 2 illustrate a steelyard-rod and its clevis embodying my improvements; Figs. 3, 4, and 5, broken sections taken at the corresponding lines of Figs. 1 and 2; Fig. 6, a perspective view of a bearing-block; Fig. 7, a development of a mounting employed for an agate bearing-block; Figs. 8 and 9, enlarged broken sections of the lower end of the steelyard-rod, the latter section being taken as indicated at line 9 of Fig. 1; Figs. 10 and 11, views of a scale-loop for use in the base of a scale; Figs. 12 and 13, broken sections illustrating a modification of the clevis shown in Figs. 1 to 5, inclusive, the latter section being taken as indicated at line 13 of Fig. 12; Fig. 14, a view in edge elevation of the part shown in Fig. 13; Fig. 15, a broken view of a leg of a spider or frame now in common use, showing the same equipped with an agate bearing-block; and Fig. 16, a section taken at line 16 of Fig. 15.

Referring to Figs. 1 to 9, inclusive, A represents a steelyard-rod, B a clevis at the upper end thereof, and C a hook at the lower end thereof. It is usual to provide the clevis B with concave surfaces or V-shaped recesses for engaging knife-edges at the sides of the scale-beam. In the improved construction the clevis is preferably provided with perforations or openings $a$, which receive metal housings or mountings $b$ for agate bearings $c$. Fig. 7 shows a development of one of the mountings $b$. The mounting is preferably stamped from sheet metal and has at its base a central cone $b'$, and at its sides vertical bearings or knife-edges $b^2$ in alinement with the cone $b'$. Lateral lugs $b^3$ are provided for engaging inclined surfaces $b^4$ at the clevis end and retaining the mounting in proper position, and end lugs $b^5$ are provided for retaining the bearing-block in proper position. As illustrated in Fig. 6, each bearing-block is provided at its base or side opposite its bearing-surface with a recess $b^6$, which receives the cone $b'$. In Fig. 7 the dotted lines $b^7 b^8$ indicate the lines on which the metal is bent in forming the mounting. After the block is in place the lugs $b^5$ are bent over to retain the block loosely in place. After the mounting is placed in position within the perforation $a$ the lugs $b^3$ are bent away from the bearing-block and caused to engage the adjacent shoulders of the clevis end, whereby the mounting is retained in proper position. From this description it will be understood that the bearing-block is free to swing in both a horizontal plane and a longitudinal vertical plane, but not in a transverse vertical plane.

As clearly illustrated in Figs. 8 and 9, the hook C at the base of the steelyard-rod is provided with a socket or recess $d$, flanked by vertical bearings or knife-edges $d'$, which receive between them the lateral surfaces of the bearing-block $d^2$. The bearing-block is provided at its base with a concavity, which receives the conical end of a screw $d^3$. The bearing-block is loosely retained in position by means of pins or lugs $d^4$. The knife-edges $d'$ are in alinement with the conical end of the screw $d^3$, thereby permitting swinging of the bearing-block in a horizontal plane. The bearing-block is also free to swing in a longitudinal vertical plane, as is evident.

Figs. 10 and 11 show a loop D provided with a recess or socket $f$, receiving a bearing-block $f'$. A screw $f^2$, provided with a conical end, enters a recess in the bearing-block, and vertical knife-edges $f^3$ are provided for engaging the lateral surfaces of the bearing-block. Lugs or pins $f^4$ serve, with the screw $f^2$, to prevent dislodgment of the bearing-block.

Figs. 12 and 13 show a modified form of clevis for the steelyard-rod. B' represents the clevis, each end of which receives a sheet-metal mounting $g$, having its metal stamped in at points $g'$, $g^2$, and $g^3$ to form, respectively, retaining-lugs, vertical lateral knife-edges, and a bearing-cone. Fig. 14 shows the recesses on the external surface of the mounting made in forming a knife-edge and a retaining-lug. The ends of the mounting $g$ are connected with the clevis ends by rivets or screws, as shown.

Figs. 15 and 16 illustrate the manner in which my invention may be applied to the legs of a platform-supporting frame or spider. These views illustrate the legs in an inverted position. E represents a leg of such a frame provided with a socket or recess $h$, which receives a housing $h'$, having vertical knife-edges $h^2$, a cone $h^3$, block-retaining lugs $h^4$, and mounting-retaining lugs $h^5$. As illustrated in Fig. 16, retaining-shoulders are provided at the ends of the base of the socket $h$ for engagement with the lugs $h^5$.

In all these constructions it will be noted that the bearing-block is free to swing in a horizontal plane and in a longitudinal vertical plane, but is held against swinging in a transverse vertical plane. In all of the said constructions also the cone at the base of the bearing-block and the retaining-lugs at the top or bearing surfaces of the bearing-block serve effectually to prevent dislodgment of the bearing-block.

The manner of assembling the parts and using the invention will be understood by those skilled in the art from the foregoing description. The hook at the lower end of the steelyard-rod, as is well known, serves to engage a knife-edge on the adjacent lever, which forms a portion of the support for the platform. In the case of the bearings for all the positions mentioned the bearing-block is either inverted or subjected to a considerable movement, which would have the effect of dislodging the bearing-block were not suitable retaining means provided.

In a scale-loop a bearing-block has been provided having a swinging movement in a vertical longitudinal plane; but, so far as I am aware, none has ever been provided wherein a free movement in a horizontal plane was ever heretofore allowed.

Changes in minor details of construction within the spirit of my invention may be made.

What I claim as new, and desire to secure by Letters Patent, is—

1. An improved scale-bearing, including a member provided with a socket for a mounting, a mounting with a lined base and lateral bearings, a bearing-block retained in said mounting and self-adjustable therein, and means for retaining said mounting in said socket, substantially as and for the purpose set forth.

2. An improved scale-bearing, including a member provided with a mounting-receiving recess, a mounting provided with an integral conical base-bearing and alined lateral bearings and having mounting-retaining lugs and bearing-block-retaining lugs, and a bearing-block provided with a recess at its base for receiving said conical bearing, substantially as and for the purpose set forth.

3. In a scale-bearing, the combination of a member provided with a mounting-receiving recess and having retaining-shoulders at the ends of said recess, a mounting provided with retaining-lugs engaging said retaining-shoulders and having a conical bearing at its base and lateral bearings in alinement therewith, a bearing-block provided at its base with a recess receiving said conical bearing, and retaining-lugs for preventing dislodgment of the said bearing-blocks, substantially as and for the purpose set forth.

4. In a scale-bearing, the combination of a member provided with a mounting-receiving recess and having retaining-shoulders at the ends of said recess, a mounting provided with retaining-lugs and engaging said retaining-shoulders and having a bearing at its base and lateral bearings in alinement therewith, a bearing-block resting at its base on the bearing at the base of said mounting, and retaining-lugs for preventing dislodgment of the bearing-blocks, substantially as and for the purpose set forth.

EDWIN FINN.

In presence of—
D. W. LEE,
ALBERT D. BACCI.